United States Patent [19]
Meier

[11] 3,792,286
[45] Feb. 12, 1974

[54] COMBINING INVERTERS FOR HARMONIC REDUCTION

[75] Inventor: Udo H. Meier, Luzern, Switzerland

[73] Assignee: Reliance Electric Company, Cleveland, Ohio

[22] Filed: Oct. 12, 1971

[21] Appl. No.: 187,974

[52] U.S. Cl............ 307/58, 307/32, 307/82, 318/227, 321/9 R, 321/27 MS, 321/DIG. 1
[51] Int. Cl. ............................ H02j, H02m
[58] Field of Search 321/9 R, 9 H, 26, 27 R, 27 MS, 321/DIG. 1; 307/32, 58, 82, 18, 19; 323/83; 318/225, 227

[56] References Cited
UNITED STATES PATENTS

| | | | |
|---|---|---|---|
| 3,671,846 | 6/1972 | Corey | 321/27 MS |
| 3,611,085 | 10/1971 | Rosenberry | 318/225 R |
| 3,657,633 | 4/1972 | Urish | 321/27 MS |
| 3,477,010 | 11/1969 | Ve Nard | 321/27 R |
| 3,628,123 | 12/1971 | Rosa et al. | 321/26 |
| 3,648,149 | 3/1972 | Brown et al. | 321/26 |

FOREIGN PATENTS OR APPLICATIONS

| | | | |
|---|---|---|---|
| 190,974 | 3/1967 | U.S.S.R. | 321/9 R |
| 276,231 | 10/1970 | U.S.S.R. | 321/9 R |

OTHER PUBLICATIONS
Electrical Manufacturing, "Design Techniques for Static Inverters," pp. 90, 91, Feb. 1960, Primary Examiner—William H. Beha, Jr.
Attorney, Agent, or Firm—Woodling, Krost, Granger & Rust

[57] ABSTRACT

A plurality of polyphase inverters are connected in circuit to substantially common polyphase loads through a polyphase reactor. Windings from each phase of each inverter are provided on the reactor to cancel the component of flux of the fundamental frequency within the reactor and to have the reactor substantially absorb the NP±1 harmonics where N is the number of inverters and P is the number of phases. For two three-phase inverters this substantially cancels the fifth and seventh harmonic voltages within the reactor applying a true 12-step voltage wave to each of the two common three-phase loads with nothing smaller than the 11th harmonic voltage supplied to each load. The two inverters are phase displaced by 360°/2NP which normally at a 30° phase angle would be a voltage loss of 3 ½ percent applied to the load yet this reactor connection applies 100 percent voltage to the loads and the load power factor is reflected directly to each inverter. The loads may be DC isolated, permitting series connection of the inputs of the inverters from a single high voltage DC supply.

36 Claims, 17 Drawing Figures

INVENTOR.
UDO H. MEIER
BY Woodling, Krost, Granger and Rust
ATTORNEYS.

COMBINING INVERTERS FOR HARMONIC REDUCTION

BACKGROUND OF THE INVENTION

The art of building inverters has been developed over the past few years until now there is need for high powered multiple inverter systems. Often the systems feed induction motor loads at variable voltage and frequency and must operate over a wide range.

It is well known to output an inverter into a single or polyphase isolating transformer and to combine windings therefrom to take advantage of phase displacements in the inverters to cancel harmonics. This technique while straight-forward requires that each transformer have the volt second capacity materialwise to handle the minimum inverter frequency at maximum voltage. For low frequency units this technique can result in very large transformers and the practice is almost limited entirely to fixed frequency inverter systems.

For variable frequency systems pulse width modulation is often used to reduce voltage when frequency is down. This allows one to use the isolating transformer technique but still a large magnetic structure is required particularly when the final wave is made up of many winding segments at different angles from each other.

A common technique for paralleling two inverters is to use a common center tapped reactor, often calling a spanning reactor, between the two inverters and to take the output voltage as the average of the two inverter voltages. This reactor is at least not a completely isolated winding structure and so is less bulky much as an auto-transformer would be as compared to an isolating transformer. The output voltage of this type of system removes some of the fifth and seventh harmonic found with the six-step output from the three phase inverter inputs but does not completely get rid of them. The wave shape formed is an imperfect 12-step wave rather than a "true" or zero fifth/seventh harmonic wave form.

The main objective of paralleling two or more inverters is to obtain higher power capabilities. This can be realized by connecting two inverters in parallel with very small reactors of the spanning reactor type, that limit currents between the inverters due to small differences in timing between corresponding phases. Additionally, with a spanning reactor, the load voltage waveform can be substantially improved by properly phase shifting the output of the two inverters. In the case of the spanning reactor type of FIG. 1, with two three-phase inverters and a single load, then the six-step waveform from each inverter can be changed into an imperfect 12-step by phasing the two inverters 30° apart. This is an imperfect 12-step wave because it does contain some fifth and seventh harmonics.

Figure 1:
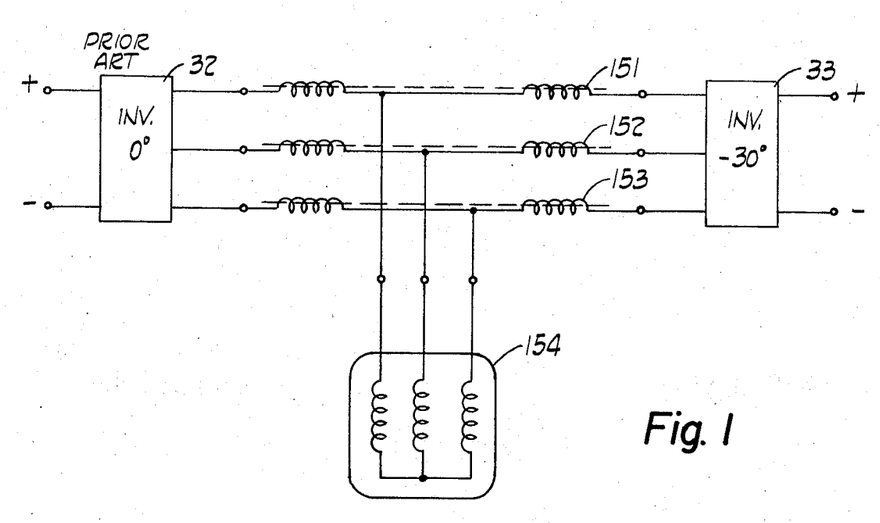
FIGS. 1 and 2 are schematic diagrams of prior art arrangements of inverter circuits.

In the prior art spanning reactor arrangement of FIG. 1 the flux required to be carried by the reactor is quite high; hence, the physical size of the reactor must be large. The reactor current is equal to the inverter current but the power factor of the two inverters are different. The angular difference in the power factors is equal to the phase displacement between the two inverters. Also, three reactor cores are needed each carrying one winding rather than being able to use a polyphase reactor.

Figure 2:
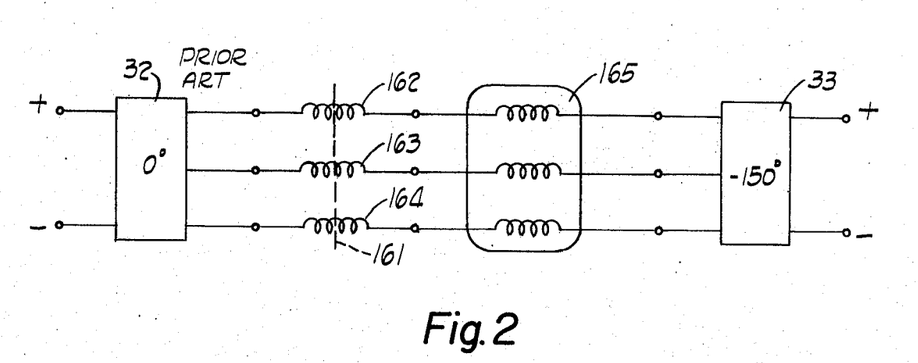

A prior art modification of the spanning reactor is shown in FIG. 2 with a series reactor between one inverter and a load which load also is supplied from another inverter phase-shifted with respect to the first inverter.

It is possible to obtain a 12-step output waveform from two three-phase inverters which each have a six-step output. Each inverter output is supplied to primaries of different isolating transformers. The secondaries of these two transformers are connected in zig-zag fashion in series to obtain a 12-step output wave. However, in such case the isolating transformer has to have a volt-ampere capacity equal to the output of the inverter because it must handle all of the output including the fundamental flux component as well as the harmonics.

Accordingly, an object of the invention is to obviate the above-mentioned disadvantages.

Another object of the invention is to provide a reactor in circuit with paralleled inverters where the reactor is three to five times smaller than formerly required.

Another object of the invention is to provide an inverter paralleling circuit utilizing a reactor wherein the fundamental flux component is substantially canceled within the reactor so that it is physically small.

Another object of the invention is to provide an inverter paralleling reactor which eliminates the 3 ½ percent loss of voltage normally encountered by paralleling inverters having a 30° phase displacement.

Another object of the invention is to provide an inverter paralleling circuit with a reactor which substantially absorbs the $NP \pm 1$ harmonics, N being the number of inverters and P the number of phases, so that substantially no harmonics less than $2 NP \pm 1$ are supplied to the load.

Another object of the invention is to provide an inverter paralleling circuit wherein the load power factor is reflected directly to each inverter.

Another object of the invention is to provide two three-phase inverters connected in parallel wherein the two six-step outputs of the inverters are interconnected to supply two 12-step voltage waveforms to each load.

Another object of the invention is to provide an inverter paralleling circuit wherein the loads may be DC isolated, thus permitting the inverter inputs to be interconnected such as connected in series.

Another object of the invention is to provide an inverter paralleling circuit which substantially eliminates the fifth and seventh harmonic voltages in a common load of the inverters.

Another object of the invention is to provide a reactor in which the volt second requirement is only a small fraction of the volt second requirement of an inverter coupling system using isolating transformers.

Another object of the invention is to show a reactor coupling means in which the fundamental frequency is canceled out in the reactor iron and which need be designed to support the only harmonic voltage differences.

Another object of the invention is to provide a means of connecting multiple induction motors to power a common load while being provided with power from a variable frequency inverter.

Another object of the invention is to show how harmonics can be removed by suitable paralleling of inverters through a reactor having substantially two windings per "phase" of inverter.

Another object of the invention is to transform the square wave output voltages of multiple three-phase inverters so that they are more fully utilized than with other schemes.

SUMMARY OF THE INVENTION

The invention may be incorporated in an inverter circuit for supplying energy to a plurality of loads, comprising in combination, a plurality of polyphase inverters operable at a phase displacement therebetween of 360°/2NP, where N is the number of inverters and P is the number of phases, reactor means having P phases, winding means on said reactor means for each phase and for each inverter, and means connecting said winding means in circuit with each inverter phase and its respective load to cancel the fundamental frequency component of the flow within said reactor means.

Other objects and a fuller understanding of the invention may be had by referring to the following description and claims, taken in conjunction with the accompanying drawing.

DESCRIPTION OF THE PREFERRED EMBODIMENT

Figure 3:
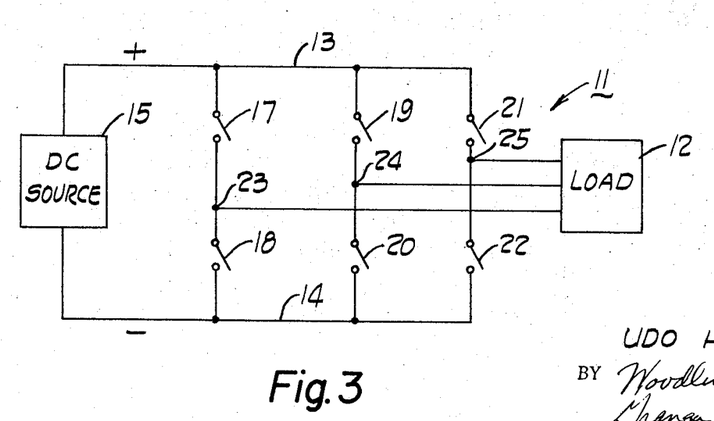
FIG. 3 is a schematic diagram of a single inverter used in the present invention.

FIG. 3 illustrates some elements of a schematic diagram of a single inverter 11 of the polyphase type, in this case three-phase, supplying a three-phase load 12 from positive and negative supply terminals 13 and 14. These supply terminals may come from any suitable DC source 15, which may be, for example, a three-phase rectifier rectifying a three-phase alternating current voltage. It should be recognized that there are many types of three-phase inverters, any one of which can provide an input to the reactor windings. The inverter 11 is a three-phase bridge configuration including three pairs of switches, each pair being connected in series between the positive and negative terminals 13 and 14. Switches 17, 19 and 21 are connected to the positive terminal 13 and the switches 18, 20 and 22 are connected to the negative terminal 14. The junctions 23, 24 and 25 between the three pairs of thyristor switches are connected to supply the three-phase load 12.

Each of the load terminal junctions may have only two different voltage conditions. Junction 23 will be positive when switch 17 is closed and will be negative when switch 18 is closed. The same is true for the other load terminals. Suitable control circuits are provided to sequentially close the switches to apply an alternating voltage to the load. The inverter may have some means to change the output fundamental frequency and may have some means to change the effective output voltage.

FIG. 3 is a symbolic representation of a three-phase square waveform inverter, which in reality, is nothing but a combination of controllable switches. Usually, today, the switches are in the form of thyristors and diodes with suitable gating and turn-off circuitry. Since this invention is universal, it is not deemed necessary to show more than the symbolic representation for the inverter.

The inverter control may employ any of a number of suitable inverter control circuits from simple control circuits up to more complex ones such as that in the "Pulse Width Modulated Inverter", U.S. Pat. No. 3,461,373 issued Aug. 12, 1969; "An Integral Ratio Carrier Inverter," application Ser. No. 2,780 filed Jan. 14, 1970; or the "Pulse Width Modulated Inverter Adaptive Logic," application Ser. No. 77,108 filed Oct. 1, 1970.

Figure 4:
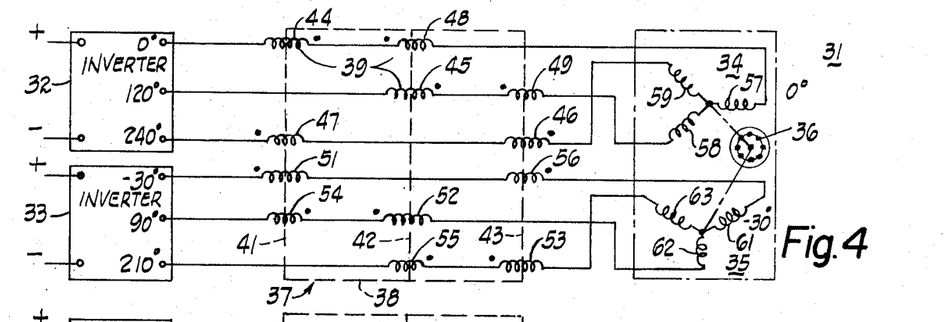
FIG. 4 is a schematic diagram of the preferred embodiment of inverter circuit.

FIG. 4 shows the preferred embodiment of an inverter circuit 31 used for paralleling a plurality of inverters, in this case, two inverters 32 and 33, each of which may be of the type shown in FIG. 3. This inverter circuit 31 supplies energy to a plurality of loads and in this preferred embodiment the loads are substantially common and are shown as first and second stator windings 34 and 35 each supplying a rotating magnetic field to a common rotor 36, thus establishing the common load. The plurality of inverters 32 and 33 are operable at a phase displacement therebetween of 360°/2NP, where N is the number of inverters and P is the number of phases. In this case there are two inverters and each is a three-phase inverter; hence, the phase displacement is 30 electrical degrees between the two inverters. Also included in the inverter circuit 31 is reactor means. In this preferred embodiment the reactor means is a single polyphase reactor with the number of phases corresponding to that of the inverters and the loads. The reactor 37 has a single magnetic core of the three-legged type and this may be a simple flat core such as made up from a stack of E-I laminations with winding means 39 on each of the three legs of this core 38. The winding means 39 are provided on the reactor 37 for each phase and for each inverter. In this preferred embodiment there are two major windings and two minor windings for each leg 41, 42 and 43 of the reactor core 38.

The winding means are connected in circuit with each inverter phase and its respective load to cancel the fundamental frequency component of the flux within the reactor core 38. In the preferred embodiment this is accomplished by the winding means 39 having four windings on each reactor leg, two major windings and two minor windings. More specifically the winding means 39 includes major windings 44, 45 and 46 connected in series between the inverter 32 and load 34 and include minor windings 47-49 also connected in series between the inverter 32 and its respective load 34. The winding means 39 further include major windings 51, 52 and 53 and minor windings 54, 55 and 56 connected in series between the inverter 33 and its respective load 35. The three outputs from the inverter 32 have been designated as 0°, 120° and 240° supplying respectively the phase windings 57, 58 and 59 of the motor stator winding 34. As stated above, the inverter 33 has a 30° phase displacement relative to the output of inverter 32 and in this case is shown as a −30° so that the output terminals of this inverter 33 are designated as −30°, 90° and 210°. These outputs supply phase windings 61, 62 and 63 of the second stator winding 35, respectively.

Figure 8:
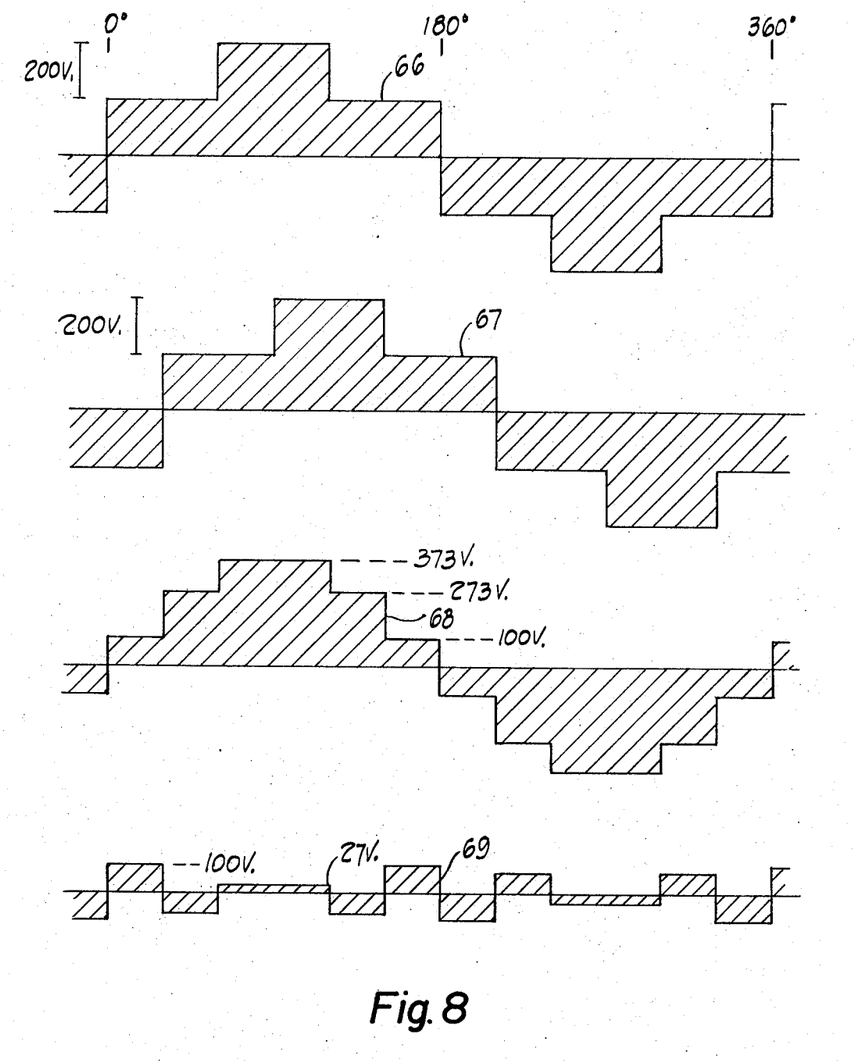
FIG. 8 is a graph of voltage waveforms.

FIG. 8 has waveforms 66 and 67 illustrating the output of the inverters 32 and 33, respectively. Each is shown as a six-step output voltage wave which is the case with an unmodulated output of the phase-to-neutral voltage. By unmodulated is meant when no pulse width modulation is present to create notches in the output. These waveforms 66 and 67 clearly show the six steps per 360° cycle of the fundamental voltage and show that the output 67 of inverter 33 is phase displaced 30° lagging relative to that of the output 66 of inverter 32. A review of FIG. 4 will illustrate that the line-to-line voltage, that is, the output terminals of inverter 32, passes through two major windings, two minor windings, and two load phase windings in series. This connection of the winding means 39 establishes a true 12-step motor voltage winding as shown by waveform 68 in FIG. 8. Because of the interaction of the flux on the reactor core 38, each inverter 32 and 33 applies a true 12-step voltage to its respective load stator winding 34 and 35. By a true 12-step voltage is meant one which has the proper amplitude of steps so that there are substantially zero harmonic components of the form $(6\pm1 + M \cdot 12)$, where $= 0, 1, 2, 3 \ldots \infty$. This has been verified by oscilloscope readings taken on an inverter system constructed in accordance with the present invention.

Waveform 69 of FIG. 8 illustrates the reactor voltage which appears across the reactor windings in a particular motor load circuit and is obtained graphically by subtracting the waveform 68 from the waveform 66. The voltages shown on FIG 8 are by way of example for an operating inverter circuit 31. It will be observed from the waveform 69 that there is no fundamental component of voltage present in the reactor 37, only higher harmonics and primarily the fifth and seventh harmonics of the voltage. The fifth and seventh harmonics have been neutralized and substantially canceled from the 12-step voltage waveform 68 and appear substantially only across the reactor 37.

Figure 9:
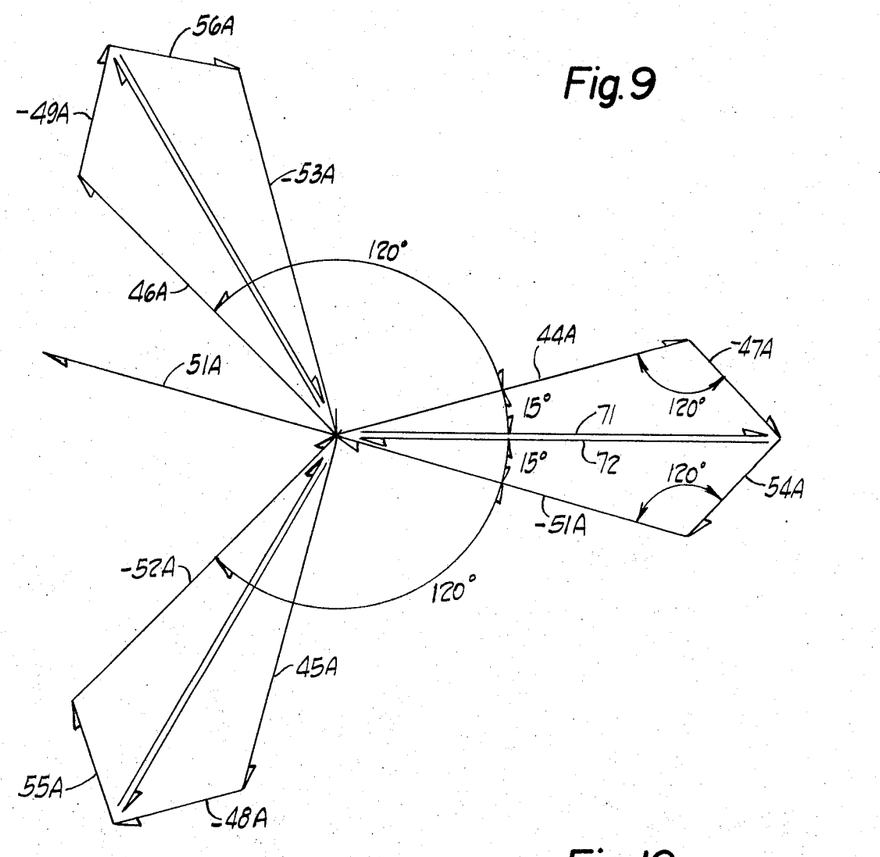
FIG. 9 is an ampere turn vector diagram.

FIG. 9 gives a vector diagram of the ampere turn relationships in the reactor 37. The vectors of the ampere turns on FIG. 9 have been given the suffix A to the reference numerals 44–56 to indicate that they are the ampere turns caused by the respective winding 44–56. These ampere turn vectors 44A–56A are those at the fundamental frequency of operation of the inverter circuit 31. Referring to the vector diagram of FIG. 9, three lobes are shown, one for each phase.

The vector 51A, for example, is 150° displaced from the vector 44A in this FIG. 9 because of the connection in opposition of the windings 44 and 51 relative to the inverter voltage sources 32 and 33. Accordingly, a negative vector −51A has been drawn as a part of the first lobe and other vectors have been designated as negative vectors because of the connection in opposition of the respective windings. One notes that vectors 44A and −47A may be combined to produce a vector 71 horizontally to the right in this figure. Also vectors 54A and −51A may be combined to produce a vector 72 horizontally to the left. The net result of these two vectors 71 and 72 is zero which is another way of stating that the net results of the vectors 44A, −47A, 54A and −51A is zero. The same is true for each of the other two lobes of this vector diagram and this illustrates that the resultant ampere turns are zero for the 30° phase-shifted fundamental currents.

To achieve this zero ampere turns of the fundamental, each of the minor windings 47–49 and 54–56 are a value of K times the ampere turns of the major windings 44–46 and 51–53. In this case the factor K equals $(\sqrt{3}-1)/2 = 0.366$. This value may be obtained either by geometry from FIG. 9 or calculated mathematically. Further, from FIG. 9 it will be noted that the ampere turn vector 47A is parallel to but in the opposite direction from ampere turn vector 46A. This is chosen purposely so that these ampere turn vectors may be obtained from the actual reactor 37. As shown in FIG. 4 the windings 46 and 47 are in series so that they have the same current therethrough and the same phase angle. The schematic diagram of FIG. 4 illustrates a dot beside each winding and this indicates the start of that particular winding. This shows that the flux established by windings 44 and 51 are generally in opposition; namely, 150° out of phase as illustrated in FIG. 9. This zero resultant of ampere turns for the fundamental currents in the reactor has two beneficial results. All of the fundamental component is passed to the motor or other load in order to supply torque or power thereto and secondly, the volt-second capacity or volt-ampere capacity of the reactor 37 may be made much smaller than normal. It may be made much smaller because now the reactor need only support the flux of the fifth, seventh, seventeenth, nineteenth and higher harmonics rather than having to support the flux of the fundamental as in the prior art designs of reactors or isolating transformers.

Figure 10:
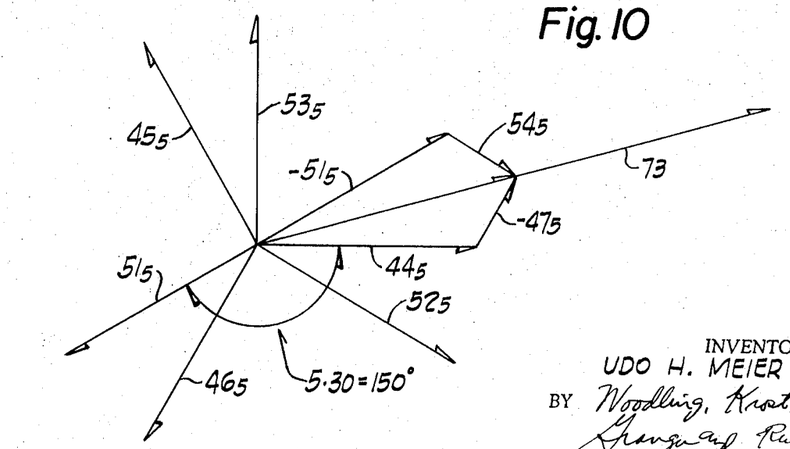
FIGS. 10-13 are vector diagrams of harmonic ampere turns.

FIG. 10 is a vector diagram of the ampere turns of the fifth harmonic currents in the reactor 37. In this case the ampere turn vectors on FIG. 10 have been given a subscript of 5 such as $44_5$ to indicate the fifth harmonic of the ampere turns for each of the windings 44–56. For the fifth harmonic, this is a backward traveling harmonic relative to the fundamental, which in a motor, establishes a retarding torque on the motor. Accordingly, the main vectors $44_5$, $45_5$ and $46_5$ are shown as being disposed in a counterclockwise rotational direction. The 30° displacement between the inverter outputs of the fundamental results in a five times that angle or 150° displacement between the fifth harmonic of the inverter outputs. The fifth harmonic vectors for the second inverter 33 are accordingly displaced 150° relative to the vectors of the first inverter 32 in this FIG. 10.

In FIG. 10 the vector $51_5$ has been shown also the negative thereof $-51_5$ as a part of the lobe of this vector diagram which extends to the right. Again, as in FIG. 9 this is because the windings 44 and 51 are connected generally in opposition relative to the inverters 32 and 33. FIG. 10 shows that there are four vectors $44_5$, $-47_5$, $-51_5$ and $54_5$ in one lobe which give a resultant ampere turn vector 73 for this fifth harmonic. There are two other symmetrically spaced vectors not shown on the FIG. 10, for the other two phase-to-neutral voltages, but similar to the three lobes of FIG. 9. This illustrates that there is a large resultant ampere turn vector for the fifth harmonic, the vector 73, present in this reactor 37. Also, this FIG. 10 illustrates that substantially none of the fifth harmonic voltage from each of these two inverters 32 and 33 is passed to the loads 34, 35. This again is very desirable because for a motor load the fifth harmonic is a backward rotating or retarding torque harmonic and for all loads it is merely something which creates additional heating. By having this fifth harmonic largely present within the reactor 37, a superior voltage wave 68, FIG. 8 is supplied to the load 34, 35.

Figure 11:
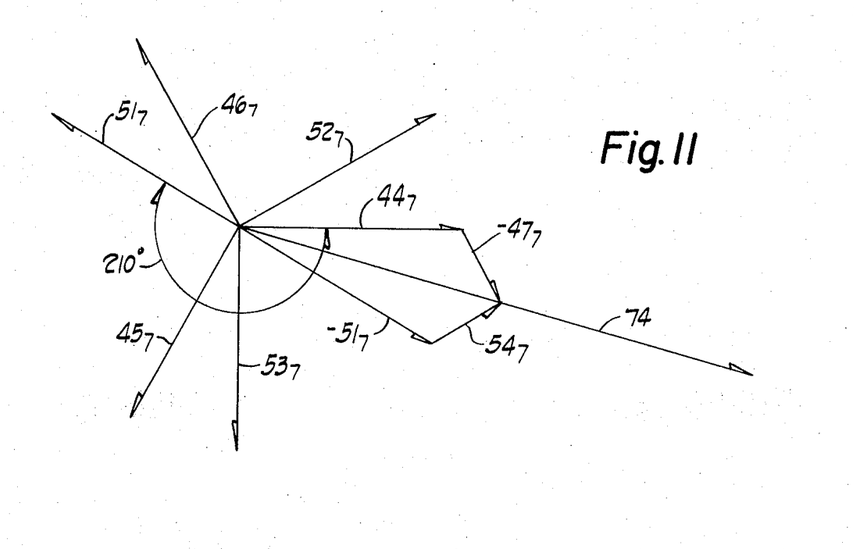

FIG. 11 is similar to FIG. 10 but is a vector diagram of the ampere turn vectors for the seventh harmonic within the reactor 37. Again the vectors have been provided with a subscript 7 for each of the windings 44–56. The seventh harmonic is a forward rotating vector relative to the fundamental. Also, for this seventh harmonic the vector $51_7$ is displaced 210° or seven times 30° relative to the ampere turn vector $44_7$. Again in FIG. 11, as in FIG. 10, only a single lobe has been shown, however the other two lobes symmetrically displaced are present. The lobes shown in FIG. 11 shows a resultant ampere turn vector 74 for the seventh harmonic. This illustrates that a large seventh harmonic flux is present in the reactor 37 and it substantially cancels these seventh harmonics from being applied to the two loads 34 and 35.

Figures 12, 13:
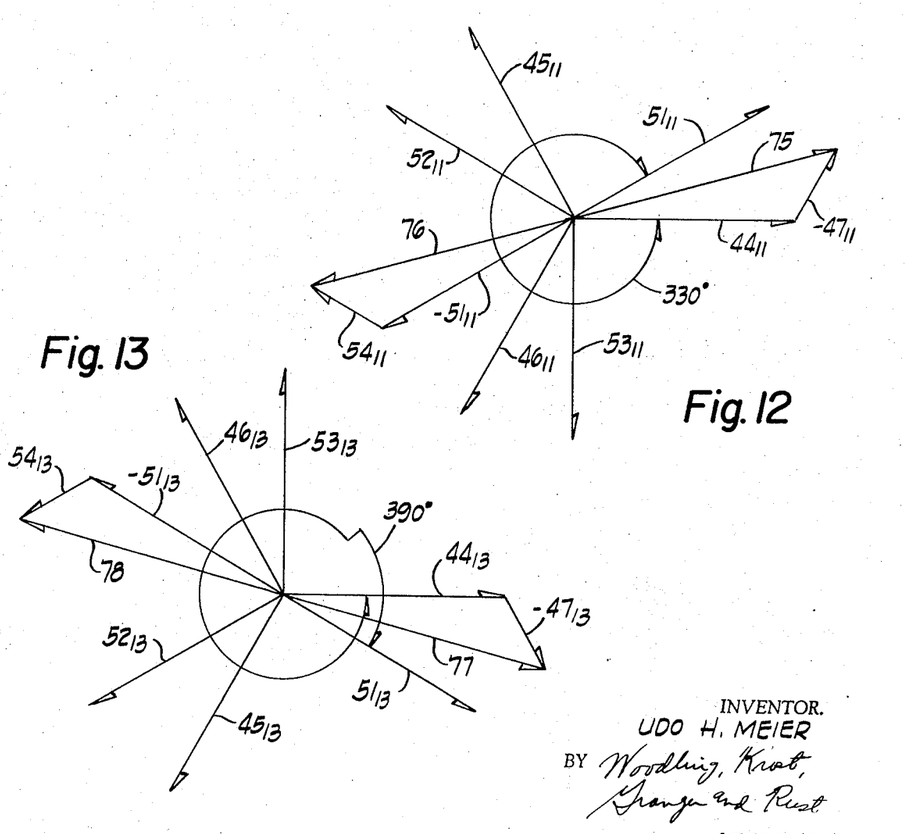

FIG. 12 is a vector diagram of the ampere turns for the 11th harmonic within the reactor 37. This 11th harmonic for each of the windings is illustrated by a subscript 11 for the numerals 44–56. The 11th harmonic is a backward rotating vector and is phase-shifted eleven times 30 or 330° between the inverter outputs as illustrated in this FIG. 12. Again considering only one lobe, or one reactor leg 41, the ampere turn vectors $44_{11}$ and $-47_{11}$ combine to form a vector 75. Ampere turn vectors $54_{11}$ and $-51_{11}$ combine to form a vector 76 which is equal and opposite to the vector 75. This shows that the resultant ampere turns equal zero for this 11th harmonic in the reactor 37. The same is true for the other two legs 42 and 43 although not shown in this FIG. 12.

FIG. 13 shows the ampere turn vectors with a subscript 13 for the 13th harmonic within the reactor 37. For this 13th harmonic there is a 390° displacement between the 13th harmonic output of the two inverters. Also, for this 13th harmonic this is a forward rotating vector rotation relative to the fundamental. Again in FIG. 13 only one reactor core leg 41 is illustrated and the vectors $44_{13}$ and $-47_{13}$ combine to produce a vector 77. Vectors $54_{13}$ and $-51_{13}$ combine to produce a vector 78 equal and opposite to vector 77 to show that the resultant ampere turns equal zero for this 13th harmonic within the reactor 37. This means that the 11th and 13th harmonics are not supported within the reactor 37, no resultant flux at these harmonics occurs within the reactors, and hence these are passed to the load 34, 35. Accordingly, referring to FIG. 8, none of the 11th and 13th harmonics appear in the reactor voltage waveform 69 yet these 11th and 13th harmonic voltages do appear in the motor voltage waveform 68.

Figure 5:
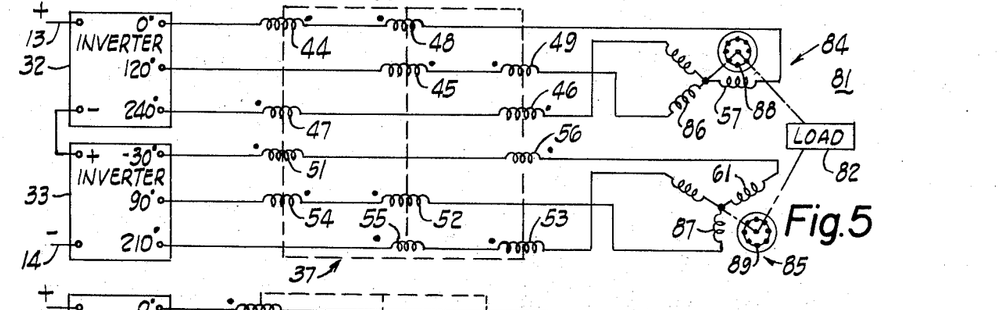
FIGS. 5, 6 and 7 are schematic diagrams of modifications of the invention.

FIG. 5 is a modification of the invention and quite similar to the schematic diagram of FIG. 4. FIG. 5 shows a schematic diagram of an inverter circuit 81 wherein the reactor 37 may be identical to that in the circuit of FIG. 4. Inverter 32 and 33 may also be identical. The load for the inverter circuit 81 is shown as a common load 82 for two separate motors 84 and 85. Each motor has a three-phase stator winding 86 and 87, respectively, energized from the inverters 32 and 33, respectively. Separate rotors 88 and 89 cooperate with the stator windings 86 and 87. The two rotors 88 and 89 may be connected on a common shaft or on a common load or substantially common load, for example, two separate motors driving two separate axles on a self-propelled railway car. Despite slight variations in diameter of the wheels on these two axles, this may be considered a substantially common load. It will be noted that in FIGS. 4 and 5 there is no DC connection between the two stator windings in each inverter circuit. In other words, the loads are DC isolated and this permits considerably more flexibility in the energization arrangements of the inverters 32 and 33. In FIG. 5 the inverters are shown as connected in series across the positive and negative terminals 13 and 14 so that these two inverters may be energized from a single high-voltage DC source. If the two loads were DC interconnected as in the prior art arrangements, then this would establish circulating currents or DC currents in the loads which could cause overheating or could otherwise be damaging. The present invention permits this electrical interconnection of the inputs 32 and 33. They may also be connected in parallel, because of the DC isolation of the loads. The vector diagrams of FIGS. 9–13 also apply to the circuit of FIG. 5.

In FIG. 5 the load stator windings 86 and 87 are shown as physically displaced thirty electrical degrees, just as in FIG. 4. In the case of two physically separate electric motors with two separate rotors, it is not necessary to establish this 30° phase displacement between the stator windings, because each stator winding cooperates with a separate squirrel cage rotor which is homogeneous around its periphery. The 30° phase displacement of the loads then occurs naturally because of the 30° phase displacement between the inverters 32 and 33.

Figure 6:
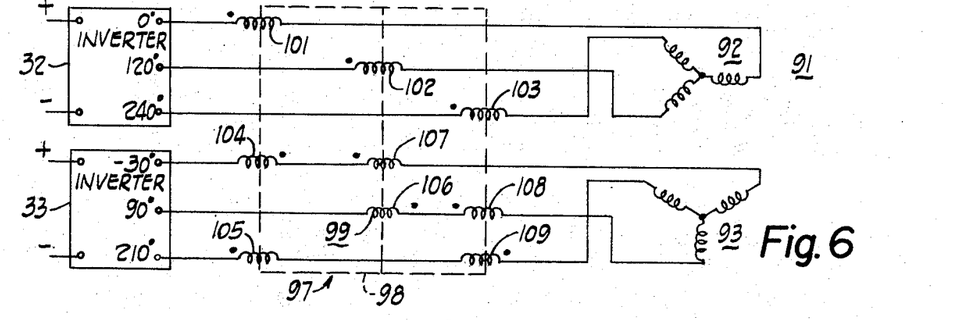

FIG. 6 is a further modification of the invention showing an inverter circuit 91. Inverters 32 and 33 may be the same as in FIGS. 4 and 5 supplying substantially common loads 92 and 93., respectively, of the same number of phases as the inverters. These loads may be motor loads as in the previous schematic diagrams or may be other polyphase loads which are interconnected or are substantially common. The inverter circuit 91 includes a reactor 97 again on a single core 98 which may be a three-legged core, the same as the core 38 for FIG. 4. This reactor 97 has been slightly simplified over the reactor 37 by having fewer windings in the winding means 99. The winding means 99 includes major windings 101, 102 and 103 connected in series between the output of the inverter 32 and the load 92. The winding means 99 also includes minor windings 104–109 connected in series in pairs between the individual phase outputs of inverter 33 and the phases of the load 93.

Figure 14:
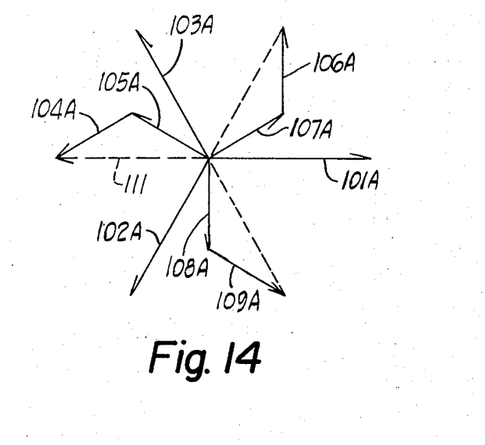
FIGS. 14 and 15 are vector diagrams of fundamental ampere turns; is voltage and current vector diagrams of two unbalanced loads; and, FIG. 17 is a vector diagram of voltages.

In FIG. 6 it will be noted that from the output of the inverter 32 there are two reactor windings 101 and 102 in series with two separate phase windings of the load 92. Adding the ampere turn vectors from each of the windings on a particular leg of the reactor gives canceling flux vectors for the fundamental frequency component. From two of the output terminals of inverter 33 there are four of the minor windings 104, 105, 106 and 108 in series with two of the phase windings of the load 93. Each of the minor windings has fewer turns than the major windings by a factor K and in this case the factor K equals $\sqrt{1/3}$ or 0.577. FIG. 14 illustrates the ampere turn vectors of the fundamental available from the inverter circuit 91 of FIG. 6. On this FIG. 14 a suffix A has been placed for the numerals 101 through 109 to indicate the ampere turn vectors for the correspondingly numbered winding 101–109. On the zero degree phase leg of the reactor 97, major winding 101 is placed and also minor windings 104 and 105. The vector sum of these two ampere turn vectors 104A and 105A is the vector 111 which cancels the ampere turn vector 101A. The same is true for each of the other two reactor legs, the fundamental ampere turns are canceled for a zero resultant ampere turns of the fundamental flux component in each leg of the reactor 97. Each reactor leg can be analyzed for fifth and seventh harmonic showing this arrangement too will cause their fluxes to add similarly to FIGS. 10 and 11. Thus this establishes the same result as the reactor 37 in FIGS. 4 and 5.

Figure 7:
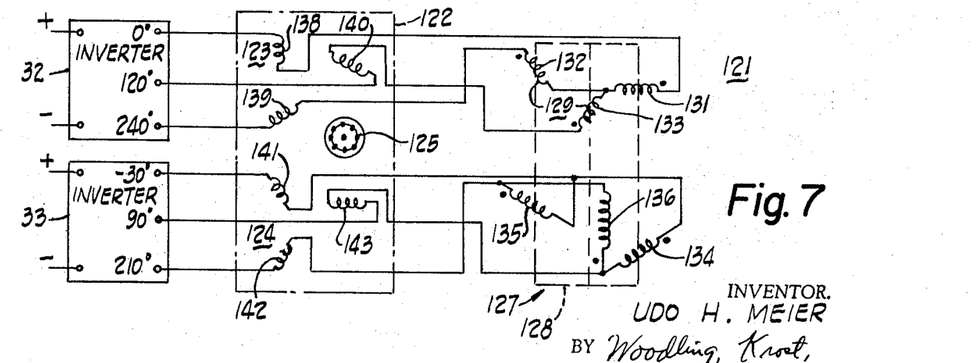

FIG. 7 is a schematic diagram of another embodiment of the invention showing an inverter circuit 121 again operating from the same inverters 32 and 33 and supplying energization to a substantially common load 122. This load may take the form of an electric motor having stator windings 123 and 124 supplying rotating torque to a common rotor 125. The stator windings 123 and 124 are shown as three-phase with an open neutral connection, neaning six terminals for each stator winding. The stator winding 123 has three separate phase windings 138, 139 and 140 and the stator winding 124 has three separate phase windings 141, 142 and 143.

Figure 15:
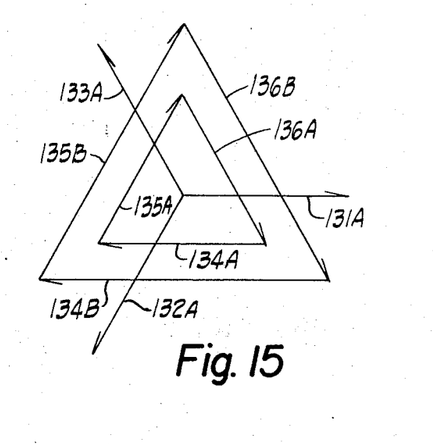

A reactor 127 is used in the inverter circuit 121 and this reactor has a reactor core 128, a single core with three legs the same as reactor 37. Winding means 129 are provided on the reactor 127 and this winding means has been simplified over that shown in FIG. 4 by having only six windings 131–137. It will be noted that the inverter circuit 121 has a series connection of windings on the reactor plus phase windings in the motor load between two output terminals of the inverter, the same as all of the other inverter circuits 31, 81 and 91. In this case, however, the load 122 is placed between the inverters and the reactor 127. Again there is a cancellation of the fundamental component of flux in the reactor 127 and in this case of FIG. 7 it is accomplished by a delta-wye connection of the windings 131–137 on the reactor 127. The windings 131–133 may have a unity value and these are connected in wye. The windings 134–136 have a greater number of turns by a K factor, in this case, the square root of 3 or 1.732. These windings 134–136 are connected in delta. FIG. 15 shows a vector diagram of the fundamental flux component ampere turns of the reactor 127. On this vector diagram the subscript A again has been used to designate the ampere turns for the correspondingly numbered winding 131–136. It will be noted on FIG. 15 that the vector 131A is equal to and opposite to the vector 134A showing that the fundamental component of flux or ampere turns is canceled in that particular leg of the reactor core 128. Also, vector 133A is equal to and opposite to the vector 136A for cancellation of the fundamental flux in that leg. On this FIG. 15 there are vectors 134B, 135B and 136B. Because the windings 136 have more turns by a factor of K, which in this case is 1.732, it might at first appear that the ampere turn vectors should be those shown by the suffix B. However, it will be appreciated that if the winding 131 has 100 turns and carries one unit of current because of its wye connection, this balances and cancels the ampere turns from winding 134 which has 173 turns and 0.577 units of current.

Figure 16:
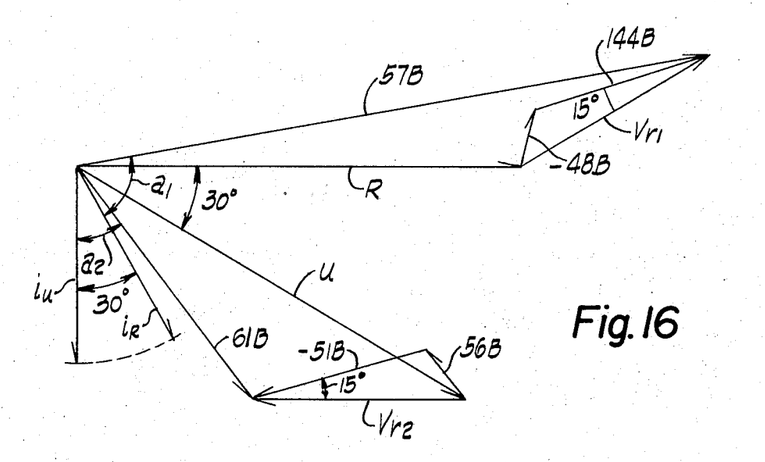

FIG. 16 illustrates vectors of voltages and current for the circuit of FIG. 5, for example, where two separate three-phase motors are shown and the load on each might be different. In FIG. 16 the suffix B has been used on various numerals to indicate voltages for that particular reactor winding or motor winding. Only one phase of the inverter circuit 81 is shown with the zero phase supplying current to phase winding 57 of the stator winding 86 and the inverter −30° output of inverter 33 supplying current to the phase winding 61 of the stator winding 87. The vector R is the phase-to-neutral of the first inverter 32 and the vector U is the phase-to-neutral voltage of the second inverter 33. Vector $V_{r1}$ is the total reactor voltage in reactor 37 due to the first inverter 32. $V_{r2}$ is the total reactor voltage in reactor 37 due to the second inverter 33. $a_1$ is the phase angle of the first motor 86 and $a_2$ is the phase angle of the second motor 87. $i_r$ is the motor current in the first motor phase winding 57 and $i_u$ is the motor current in the second motor phase winding 61.

FIG. 16 shows that with different loads on the two motors, the reactor 37 still forces the motor currents to be equal and 30° phase displaced. The reactor takes fundamental voltage away from the more loaded motor and adds voltage to the other one. The power difference between the two motors is obtained mainly through the change in motor power factors. It will be noted that the motor with the larger voltage, vector 57B, has a more lagging current $i_r$ at a larger phase angle $a_1$. In this FIG. 16 it is assumed that the second motor 85 is the more heavily loaded and hence this FIG. 16 shows that the motor phase winding 61 has a voltage vector 61B which is reduced relative to the vector 57B, the voltage applied to phase winding 57. This arrangement has a tendency to equalize power output of the motors with the voltage and hence the load being raised on the less loaded motor. This is true so long as the slip difference between the motors remains small. For induction motors this is within three to five percent of motor speed, for example. A system such as this inverter circuit 81 can operate under slip control or it can operate under open loop when the motors are mechanically rigidly coupled.

This FIG. 16 also helps to illustrate that the power factor of the load is reflected directly to each inverter. This is not the case with the prior art spanning reactor of FIG. 1 or the series reactor of FIG. 2.

Figure 17:
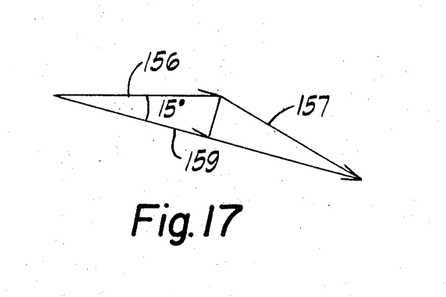

FIG. 17 illustrates another advantage of the present invention. For the prior art spanning reactor of FIG. 1 the two inverters 32 and 33 operate at a 30° phase displacement. Three separate cores for three separate spanning reactors 151, 152 and 153 are provided and the center taps are taken to the three-phase load 154.

In FIG. 17, vector 156 is the output voltage vector of one phase of inverter 32 and vector 157 is the vector of output voltage of one phase of inverter 33 of the FIG. 1 circuit. The resultant voltage vector 158 supplied to the load 154 is accordingly the vector sum of vectors 156 and 157. One-half of this or vector 159 is effectively the voltage supplied by each inverter to the load 154. Due to the 15° angle between vectors 156 and 159 and since the cosine of 15° equals 0.966, this shows that the effective voltage supplied to the load by the prior art FIG. 1 is equal to vector 159 whereas the effective voltage supplied to the load by the present invention circuit of FIG. 4 is vector 156. This vector is about 3 ½ percent longer, meaning 3 ½ percent more voltage is supplied to the load making the combined system more effective in utilizing inverter capacity. A comparison of the reactors of the present invention and those of the prior art FIGS. 1 and 2 for a particular wide frequency range application shows that the present invention requires a much smaller reactor physically. Reactor weight can be compared by the following formula:

$$W = V_s \cdot i \cdot L \cdot C, \text{ where} \quad (1)$$

$V_s$ = the highest value of volt-seconds of the reactor flux occurring at any point of the voltage/frequency curve of the inverter.

$i$ = per unit current through the reactor windings, with unity being the full load AC current of one inverter.

$L$ = the number of coils linked to the same flux.

$C$ = the number of cores (a three-legged core is rated 1.5)

In the prior art spanning reactor configuration of FIG. 1, the motor voltage is an imperfect 12-step waveform that contains 5 percent of the fifth harmonic and 4 percent of the seventh harmonic. The line-to-line motor voltage is 460 volts for a 600 volt DC input to the inverters. The motor current is twice the reactor current. The reactor voltage consists of a fundamental component that increases with phase shift between the inverters as well as all orders of odd harmonics. The highest flux level of 2.45 volt-seconds occurs at the lower frequency limit of 1 Hz. The reactor current is equal to the inverter current. The power factor of the two inverters are different, the angular difference is equal to the phase shift of the inverters. Three separate reactor cores are needed, each carrying one winding. The weight factor therefore amounts to:

$$W = 2.45 \cdot 1 \cdot 1 \cdot 3 = 7.35 \quad (2)$$

FIG. 2 illustrates another prior art inverter circuit utilizing a series reactor connection. Again the two inverters 32 and 33 are displaced, in this case by 150°. A series reactor 161 has a single core with three separate open neutral windings 162, 163 and 164 thereon. A three-phase load 165 shown as a motor, one which has three separate open neutral phase windings connected in series with the reactor windings 162–164, respectively, and connected between the two inverters 32 and 33. In this configuration the motor voltage across one winding is twice as high as the phase-to-neutral voltage in the spanning reactor arrangement of FIG. 1. The voltage waveforms are identical to those of FIG. 1. The motor current is equal to the inverter and reactor current. The reactor voltage consists of all in-phase harmonics inherent in the combined inverter voltages. The highest flux of 1.29 volt-seconds is induced at the lowest frequency. The two inverters operate at different power factors, the angles differ by the phase shift angle between the inverters. The weight factor, therefore, amounts to:

$$W = 1.29 \cdot 1 \cdot 3 \cdot 1 = 3.87 \quad (3)$$

This series reactor prior art arrangement has the defect that differences of potential, for instance at the positive bus input to the inverter, can cause a DC current to flow through all three phases that tends to saturate the reactor.

The FIGS. 4–7 show various arrangements of the present invention. Considering the circuit of FIG. 4, for the moment, one notes that the motor current is equal to the reactor and inverter currents. The highest flux level occurs at 1 Hz (more voltage is required at low frequencies to compensate for motor resistance losses) and is equal to 0.23 $V_s$. The power factor of both inverters is equal when the phase shift between the inverters is 30°. The reactor 37 has a core 38 which is a three-legged reactor core. Four coils are on each reactor leg, two coils are major windings with a given number of turns, and two coils are minor windings each with a K factor of 0.366 times that given number. This adds up to 2.73 effective number of coils linked to the flux on each leg. The weight factor then becomes:

$$W = 0.23 \cdot 1 \cdot 2.73 \cdot 1.5 = 0.94 \quad (4)$$

A comparison of Formulas 2, 3 and 4 show that the present invention is four to eight times better than the prior art with respect to the physical size and weight of the reactor. The reason for this is that the reactor 37 does not need to support any of the fundamental flux component, the smallest harmonic component of flux which it supports is the fifth harmonic. Accordingly, the reactor may be made much smaller and lighter for a saving in manufacturing costs. If load unbalance is expected, some increase in reactor size may be required.

In the present invention inverter circuits of FIG. 4–7 it is shown that there is no DC connection between the two loads and hence it is possible to interconnect the DC input sides of the two inverters. This is illustrated in FIG. 5 wherein the inputs to the two inverters 32 and 33 are connected in series from a high voltage DC power supply.

Another advantage of the inverter circuits of FIGS. 4–7 is that each of the two inverters supplies a 12-step output voltage waveform to each of the two loads. Each inverter singly has a six-step output voltage waveform but by being combined in the reactor 37 with flux from the other inverter, this provides a 12-step output voltage waveform from each inverter and reactor set.

It will be noted from FIGS. 4–7 that one inverter has a zero degrees phase angle and the other inverter has a −30° phase angle. This second inverter may be operated at a 150° phase angle which is 180° from that shown. In so doing, the starts of the various reactor windings for the second inverter would also be inverted, and as a result, the resultant ampere turn vectors would still be the same as shown in FIG. 9. The 30° phase displacement is thus electrically equivalent to a 150° or a 210° phase displacement, with appropriate reversal of the connections to the reactor windings. The phase displacement between the inverters has accordingly been described as 360°/2NP as a minimum phase displacement, and this is to be construed to cover 150° or 210° phase displacement also.

The inverter circuits of the present invention shown in FIGS. 4–7 eliminate or greatly minimize the harmonics supplied to the load. Harmonics of the order of 5 + M · 12 and 7 + M · 12, where M equals 0, 1, 2. . . , are of the order of harmonics which are minimized by this invention. As shown in FIG. 10 and 11, there is a large fifth order and seventh order harmonic flux in the reactor for a minimum voltage of these harmonics applied to the motor. The same is true for the 17th and 19th harmonics, 35th and 37th and the like. It is true that slight inaccuracies or inequalities between the three-phases of the system can lead to some of these harmonics being presented to the load, just as inequalities in the prior art system could increase the amount of harmonics or DC component supplied to the load. However, Applicant has found that a true 12-step voltage as shown in FIG. 8, waveform 68, is that which is applied to the load.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of the circuit and the combination and arrangement of circuit elements may be resorted to without departing from the spirit and scope of the invention as hereinafter claimed.

What is claimed is:

1. An inverter circuit for supplying energy to a plurality of loads, comprising in combination,
   a plurality of polyphase inverters operable at a minimum phase displacement therebetween of 360°/2NP where N is the number of inverters and P is the number of phases of each inverter,
   reactor means having a core with P legs,
   winding means on said reactor means for each phase of each inverter,
   and means connecting said winding means in series circuit with each inverter phase and its respective load of a plurality of loads to establish ampere-turns which vectorially cancel the fundamental frequency component of the flux within said reactor means and pass the fundamental frequency to the loads.

2. An inverter circuit as set forth in claim 1, wherein said connecting means connects said winding means between each inverter phase and its respective load.

3. An inverter circuit as set forth in claim 1, wherein said connecting means connects a load between each inverter phase and its respective reactor phase.

4. An inverter circuit as set forth in claim 1, wherein said winding means includes the same number of turns on each phase to provide cancellation of the fundamental frequency component of flux when the loads are equal.

5. An inverter circuit as set forth in claim 1, wherein the loads are polyphase loads equal in number to the number of inverters.

6. An inverter circuit as set forth in claim 1, wherein the loads are polyphase having the same number of phases as the phases of said inverters.

7. An inverter circuit as set forth in claim 1, wherein said winding means includes a plurality of windings connected in series between each inverter phase and its respective load.

8. An inverter circuit as set forth in claim 1, wherein said connecting means establishes a fundamental frequency voltage on said loads equal to 100 percent of the fundamental frequency output voltage of each inverter despite phase displacement of the outputs of said inverters.

9. An inverter circuit as set forth in claim 1, wherein said connecting means establishes the load power factor directly reflected to each inverter.

10. An inverter circuit as set forth in claim 1, wherein said connecting means establishes the currents in said plurality of inverters with a phase displacement therebetween of 360°/2NP.

11. An inverter circuit as set forth in claim 1, wherein said connecting means connects a plurality of winding means on each phase of said reactor means to establish vector addition of the fundamental ampere turns on each phase to equal zero when the plurality of loads are equal.

12. An inverter circuit as set forth in claim 1, wherein said reactor means has a volt-ampere capacity only for harmonic voltages.

13. An inverter circuit as set forth in claim 1, wherein said connecting means connects said winding means to absorb within the reactor the NKP ±1 harmonics present in said plurality of inverters to eliminate said harmonics from the load, where K is any odd integer.

14. An inverter circuit as set forth in claim 1, wherein said connecting means establishes said inverters as DC isolated in the load connections.

15. An inverter circuit as set forth in claim 14, including connecting the DC inputs of said plurality of inverters in series on a single pair of DC supply terminals.

16. An inverter circuit as set forth in claim 1, wherein said reactor means includes a single polyphase reactor.

17. An inverter circuit as set forth in claim 16, including winding means on each phase of said reactor corresponding to a phase of said inverters.

18. An inverter circuit as set forth in claim 17, including two windings in said winding means on each phase of said reactor.

19. An inverter circuit as set forth in claim 17, including a major and a minor winding on each phase of said reactor.

20. An inverter circuit as set forth in claim 19, including four windings on each phase of said reactor including two major and two minor windings,
   a major and a minor winding being energized from different phases of one of the inverters and another major and minor winding being energized from different phases of another of said inverters.

21. An inverter circuit as set forth in claim 20, including a single rotor acted on by the plural loads.

22. An inverter circuit as set forth in claim 1, wherein said winding means consists of only one winding on each phase of said reactor means for one inverter and two windings on each phase of said reactor means for the other inverter.

23. An inverter circuit for supplying energy to a plurality of loads, comprising in combination,
   a plurality of polyphase inverters operable at a minimum phase displacement therebetween of 360°/2NP where N is the number of inverters and P is the number of phases of each inverter,
   reactor means having a core with P legs,
   winding means on said reactor means for each phase of each inverter,
   means connecting said winding means in series circuit with each inverter phase and its respective load of a plurality of loads to establish ampere-turns which vectorially cancel the fundamental frequency component of the flux within said reactor means and pass the fundamental frequency to the loads, and said connecting means establishing a voltage from said inverters applied to the combination of said reactor means and loads which has an absence of P harmonic voltage.

24. An inverter circuit as set forth in claim 23, wherein said connecting means connects a load between each inverter phase and its respective reactor phase.

25. An inverter circuit as set forth in claim 23, wherein said winding means includes a plurality of windings connected in series between each inverter phase and its respective load.

26. An inverter circuit as set forth in claim 23, wherein said connecting means establishes a fundamental frequency voltage on said loads equal to 100 percent of the fundamental frequency output voltage of each inverter despite phase displacement of the outputs of said inverters.

27. An inverter circuit as set forth in claim 23, wherein said connecting means causes the load power factor to be directly reflected to each inverter.

28. An inverter circuit as set forth in claim 23, wherein said connecting means establishes the currents in said plurality of inverters with a phase displacement therebetween of 360°/2NP.

29. An inverter circuit as set forth in claim 23, wherein said connecting means connects a plurality of winding means on each phase of said reactor means to establish vector addition of the fundamental ampere turns on each phase to equal zero when the plurality of loads are equal.

30. An inverter circuit as set forth in claim 23, wherein said reactor means has a volt-ampere capacity only for harmonic voltages.

31. An inverter circuit as set forth in claim 23, wherein said connecting means connects said winding means to substantially absorb within the reactor the NP ±1 harmonics present in said plurality of inverters to substantially eliminate said harmonics from the load.

32. An inverter circuit as set forth in claim 23, wherein said connecting means connects said winding means to absorb within the reactor the NKP ±1 harmonics present in said plurality of inverters to eliminate said harmonics from the load where K is any odd integer.

33. An inverter circuit as set forth in claim 23, including connecting the DC inputs of said plurality of inverters in series on a single pair of DC supply terminals.

34. An inverter circuit as set forth in claim 23, wherein said reactor means includes a single polyphase reactor.

35. An inverter circuit as set forth in claim 34, including a major and a minor winding on each phase of said reactor.

36. An inverter circuit as set forth in claim 35, including four windings on each phase of said reactor including two major and two minor windings,
a major and a minor winding being energized from different phases of one of the inverters and another major and minor winding being energized from different phases of another of said inverters.

* * * * *